(12) United States Patent
Shimizu

(10) Patent No.: US 7,120,352 B1
(45) Date of Patent: Oct. 10, 2006

(54) SELECTABLE RECORDING FRAME RATE VIDEO TAPE RECORDER

(75) Inventor: Ryoichi Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 08/883,322

(22) Filed: Jun. 26, 1997

(30) Foreign Application Priority Data

Jun. 27, 1996 (JP) .......................................... P8-168013

(51) Int. Cl.
*H04N 5/76* (2006.01)

(52) U.S. Cl. .......................................... 386/65; 386/95

(58) Field of Classification Search ...................... 386/1, 386/4, 46, 52, 55, 64, 65, 35, 95, 108; 360/22, 360/13, 69, 72.1, 72.2; H04N 5/76, 5/91, H04N 5/92

See application file for complete search history.

(56) References Cited

U.S. PATENT DOCUMENTS

| | | | | |
|---|---|---|---|---|
| 4,360,843 A | * | 11/1982 | Menezes et al. ............ | 360/72.2 |
| 4,963,991 A | * | 10/1990 | Honjo .......................... | 360/22 |
| 5,229,890 A | * | 7/1993 | Okauchi ....................... | 386/65 |
| 5,239,381 A | * | 8/1993 | Takahashi .................... | 386/131 |
| 5,519,544 A | * | 5/1996 | Hara ............................ | 386/96 |
| 5,758,013 A | * | 5/1998 | Kizu et al. .................. | 386/123 |
| 6,026,212 A | * | 2/2000 | Oguro ......................... | 386/67 |
| 6,104,858 A | * | 8/2000 | Suzuki ......................... | 386/65 |

* cited by examiner

*Primary Examiner*—Thai Tran
(74) *Attorney, Agent, or Firm*—Bell, Boyd & Lloyd LLC (57) ABSTRACT

A video tape recorder is provided which is capable of recording information at different frame rates while maintaining accurate time codes. Data about a recording frame rate set at recording time and time code data about DF/NDF settings are recorded in an AUX area of a helical track as auxiliary data. Further, time code data set at recording time is recorded on a time code track. When a magnetic tape is played back, time code data not selected at recording time is also displayed on a display unit of a control panel and the screen of a monitor together with the time code data and the data about the recording frame rate selected at recording time. A user is able to perform step-by-step settings of frame rates and time codes on a playback tape while confirming the displayed data, regardless of the settings used when the original recording was made.

13 Claims, 5 Drawing Sheets

| | RECORDING MODE | | | | | PLAYBACK MODE | | |
|---|---|---|---|---|---|---|---|---|
| | fv (HZ) | DF/NDF | DISPLAY AT 1h RECORDING | NUMBER OF FRAMES/h | COINCIDENCE WITH REAL TIME | fv (HZ) | DISPLAY AT 1h PLAYBACK | NUMBER OF FRAMES/h | COINCIDENCE WITH REAL TIME |
| (1) | 59.94 | NDF | 00:59:56:12 | 107,892.11 | × | 59.94 | 00:59:56:12 | 107,892.11 | × |
| | | | | | | 60 | 01:00:00:00 | 108,000.00 | ○ |
| (2) | 59.94 | DF | 01:00:00:00 | 107,892.11 | ○ | 59.94 | 01:00:00:00 | 107,892.11 | ○ |
| | | | | | | 60 | 01:00:03:18 | 108,000.00 | × |
| (3) | 60 | NDF | 01:00:00:00 | 108,000.00 | ○ | 59.94 | 00:59:56:12 | 107,892.11 | × |
| | | | | | | 60 | 01:00:00:00 | 108,000.00 | ○ |
| (4) | 60 | DF | 01:00:03:18 | 108,000.00 | × | 59.94 | 01:00:00:00 | 107,892.11 | ○ |
| | | | | | | 60 | 01:00:03:18 | 108,000.00 | × |

SELECTABLE RECORDING FRAME RATE VIDEO TAPE RECORDER

BACKGROUND OF THE INVENTION

1. Field of the Invention

This invention relates to a video tape recorder capable of selecting a desired recording frame rate when an information signal is recorded. More specifically, the present invention relates to a video tape recorder that can simply and efficiently determine a recording mode by simultaneously recording both recording frame rate information and different types of time code information. In particular, the present invention provides means to accurately locate a reference point indexed by either a real time code or by a frame number while operating in playback mode.

2. Description of the Related Art

Existing video tape recorders (VTRs) used for digitally recording and reproducing both video and audio signals on magnetic tape, can also digitally record time information on the magnetic tape. The time information is useful as an index for playback and editing of the recording and it is typically coded using standard hours, minutes and seconds notation. For a more detailed description of the usefulness of time code based indexes or addresses for information recorded on tape, see U.S. Pat. No. 4,360,843 to Menezes et al. which is incorporated herein by reference. For example, a real time based indexing of a video tape would allow easy access to the precise frames that correspond to the start and end times of a broadcast program.

Thus, it is desirable to provide each frame with a unique time code for addressing purposes. In addition, it is also desirable to have time codes that accurately correspond to real time. Therefore, a time code would ideally be recorded for each frame. However, not all standard video signal formats have a frame rate that allows an integer number of frames to be recorded per each second of time.

For example, the National Television System Commission (NTSC) standard video signal format has a field frequency of 59.94 Hz. This means that the NTSC signal has a frame rate of 29.97 frames per second. In contrast, a high definition television signal used in a multiple sub-Nyquist sampling encoding (MUSE) system has a field frequency of 60 Hz. Thus, the high definition television signal frame rate is precisely 30 frames per second.

The consequence of not having an integer number of frames per second is that some frames cannot be assigned an hour, minute, second time code that corresponds to real time. Thus, in order to correct for the fraction of a frame that would otherwise occupy a different time code address, when a NTSC signal is recorded, two frames are skipped at the beginning of each minute except for every tenth minute. This difference adjustment allows each recorded time code to coincide with real time.

This frame-by-frame setting of the time code including the skipped frames is usually referred to as a Drop Frame (DF) stepping time code. The frames skipped to insure that the time codes correspond to real time are called "dropped frames". The normal frame-by-frame setting of time codes, which is used for signal formats that have a frame rate that allows an integer number of frames to be recorded per each second of time, does not require a frame drop adjustment. Only whole frames are assigned a given time code. As mentioned above, the high definition television signal format has a frame rate of 30 frames per second and thus, does not require a frame drop adjustment to cause the assigned time codes to correspond to real time. This frame-by-frame setting of the time code in which it is not necessary to skip frames is usually referred to as a Non-Drop Frame (NDF) non-stepping time code.

In other words, because the time required to record or reproduce one frame of, for example, a high definition television signal which has 1125 scanning lines of resolution and a field frequency of 60 Hz is 1/30 of a second (or 33.33333 ms), the real time actually required when recording or reproducing exactly coincides with the non-stepping time code without having to execute any special adjustment operations.

In contrast, when an NTSC signal which has 525 scanning lines of resolution and a field frequency of 59.94 Hz is recorded or reproduced, the time required to record and reproduce one frame is 1/29.97 seconds (or 33.36667 ms). Therefore, the real time required to record, for example, 30 frames is longer than the one second increments of the time code. The result is that the time code lags behind the real time by 0.033367 ms for every 30 seconds of recording or play back time. Over an hour recording period, this lag adds up to a four second difference.

Thus, as indicated above, when a NTSC signal and time codes are to be recorded, a time code is recorded for each frame except that two frames are skipped at the start of each minute that is not a multiple of ten. In other words, two frames are skipped at the beginning of the first through ninth minutes, the eleventh through nineteenth minutes, the twenty-first through the twenty-ninth minutes, etc. As indicated above, drop frame stepping time codes are used so that the time codes coincide with real time during recording and reproduction.

Recently developed VTRs include the capability of selecting a correct frame rate based on a recorded signal. In other words, existing VTRs are capable of determining whether the field frequency of a recorded signal is either 59.94 Hz or 60 Hz. Likewise, existing VTRs can also determine whether stepping time codes (DF) or non-stepping time codes (NDF) have been recorded on the magnetic tape. Such VTRs can simultaneously determine the frame rate and the type of time coding.

As a result of there being at least two different frame rates and at least two different time coding methods, there are at least four different possible combinations of ways a recorded signal might be found on a magnetic tape. The relationship between the time codes of the individual combinations discussed above and real time are shown in FIG. 5.

As indicated above, in order to correctly select the proper playback mode in terms of frame rate and time coding, it is necessary to determine which combination of frame rate and time coding was originally used to record the signal on magnetic tape.

Figure 5:
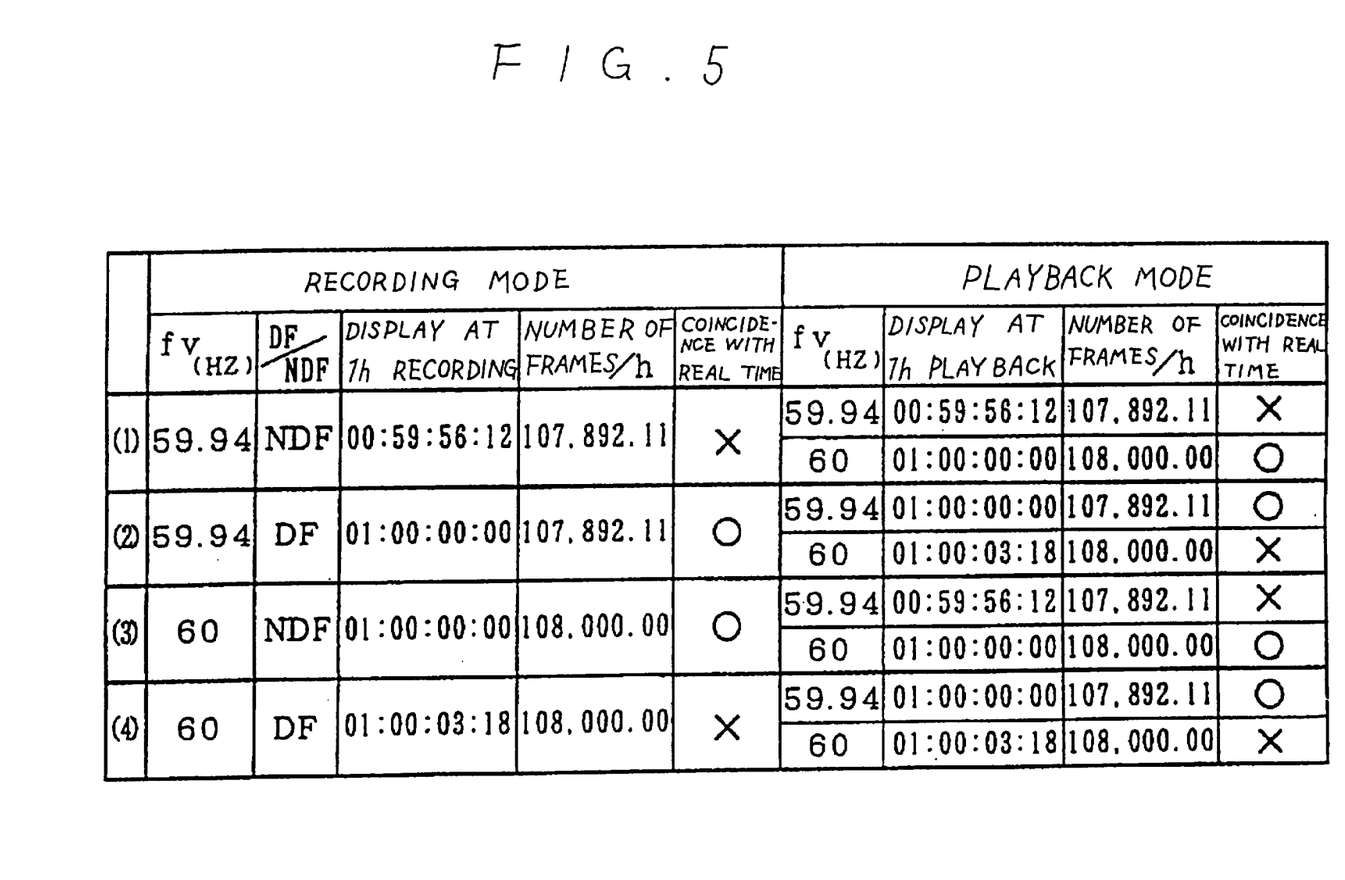
FIG. 5 is a diagram for explaining the different combinations of frame rates and time codes and the relationship between the contents of the time codes and real time.

Referring to FIG. 5, when the recording frame rate is 59.94 Hz and the time code is recorded in an NDF format as specified on row (1) in the recording mode columns, one hour of real elapsed time results in a time coding count of 59 minutes, 56 seconds, and 12 frames. This count lags the real time in that the difference is three seconds and 18 frames. Therefore, when the playback frame rate is set to 59.94 Hz in the playback mode as indicated in row (1) of FIG. 5, a difference between the real time and the time code occurs. Hence, the recording time code cannot be used as a reference when it is desired to use a broadcast time, for example, as a control time.

On the other hand, when the information signal is recorded using a field frequency of 59.94 Hz and the stepping time code DF is used as indicated on line (2) in the recording mode columns of FIG. 5, one hour of real elapsed time results in a time coding count of one hour. This count completely coincides with real time. However, the number of frames to be reproduced is not an integer number (107, 892.11 frames). This is a problem in that image editors, such as those used for animation and computer graphics, can only perform editing on whole frames. In other words, a frame is the smallest unit with which an image editor can work. When there are such fractions of frames involved, they are truncated and the result is that image transitions are not smooth.

Such a problem even arises when a high definition television signal is converted down into a ground wave and it is broadcast as a ground wave. In a VTR for HD which is capable of recording a high definition television signal (1125 scanning lines and 60 Hz field frequency) of the aforementioned MUSE system, the field frequency can be selected for recording as either 60 Hz or 59.94 Hz to preserve compatibility with a system that uses NTSC signaling (525 scanning lines and 60 Hz field frequency).

Referring to row (3) of FIG. 5, since a high definition television signal with a field frequency of 60 Hz is represented in 60 fields (or 30 frames) per second, the real time required for recording and reproducing coincides with the time displayed on the VTR's display counter if the step-by-step setting of time codes is NDF where frames are not dropped and the time codes are recorded in 1/30-second (=33.33333 ms) units every frame.

On the other hand, referring to row (4), when a NTSC signal having a field frequency of 59.94 Hz is represented in 59.94 fields (or 29.97 frames) per second, the time code is delayed 3 seconds and 18 frames with respect to real time if the time codes are recorded in the 1/30-second units for each frame as mentioned above.

Thus, if no information about how to select the frame rate and the time coded is provided upon reproduction, then a process corresponding to real time and a process to be executed based on the number of frames as a reference, cannot be performed.

Further, when the recording frame rate is set to 59.94 Hz and the time code is recorded in the NDF format, the real time does not coincide with the time code as described in row (1) of FIG. 5, and the number of frames does not result in integer number of frames. If, for example, the playback field frequency is 59.94 Hz, which is identical to the rate used at recording, but a DF-type time code is used in place of the NDF type time code, then at least the real time coincides with the time code as described in line (2) of the playback mode columns of FIG. 5.

If the setting of the time code remains unchanged and only the playback field frequency is set to 60 Hz, then the time code coincides with real time and the number of frames becomes an integer as described in line (1) of the playback mode columns of FIG. 5. It therefore becomes possible to perform image editing work with smooth transitions.

In order to allow reproduction in a format different from that used for recording it would be desirable to have a VTR in which the playback frame rate can be arbitrarily selected and either NDF or DF time code formats can be also selected for playback information.

OBJECTS AND SUMMARY OF THE INVENTION

Therefore, the present invention has been provided to solve such conventional problems. It is an object of the present invention to provide a video tape recorder wherein time codes, expressed in any format, are simultaneously recorded along with a recording frame rate. Further, a frame rate and a time code suitable for reproduction processing can be determined by the video tape playback device from the recorded information.

According to one aspect of the present invention, for achieving the above object, there is provided a video tape recorder capable of performing signal recording and reproducing processes at a plurality of different frame rates, characterized in that an input image signal is recorded at one selected recording frame rate, and a time code stepped in a non-drop frame as a time code at the time of its recording and a time code stepped in a drop frame are respectively recorded together with the selected recording frame rate.

According to another aspect of the present invention, for achieving the above object, there is provided a video tape recorder capable of performing signal recording and reproducing processes at a plurality of different frame rates, characterized in that a plurality of types of time code information and recording frame rate information are separated according to a reproduced signal, and a reproducing frame rate for the reproduced signal and a time code at that rate are selectable when reproduced-image information is used in real-time units and in units of the number of frames.

In the present invention, playback time code information of both NDF and DF formats are simultaneously recorded in addition to the recording of recording frame rate information used in a recording mode. Since a frame rate of a recording can be determined from this information in a playback mode, playback frame rate and time code information are selected according to a playback mode that places emphasis on the real time and a playback mode that places emphasis on the number of frames. When a time code different from that used in recording the signal, is used as a playback time code, the time code information reproduced together with the recording frame rate information is used as the playback time code information.

The frame rate and the time code are displayed on a display unit or a playback information monitor to allow effortless confirmation of this information.

Useful embodiments of the various present inventions have been discussed in brief. However, the above and other objects, advantages, and features of the present invention will be better understood upon consideration of the following detailed description of the invention and the accompanying drawings.

DETAILED DESCRIPTION OF THE PREFERRED EMBODIMENT

An embodiment of a video tape recorder according to the present invention will hereinafter be described in detail with reference to the accompanying drawings.

Figure 1:
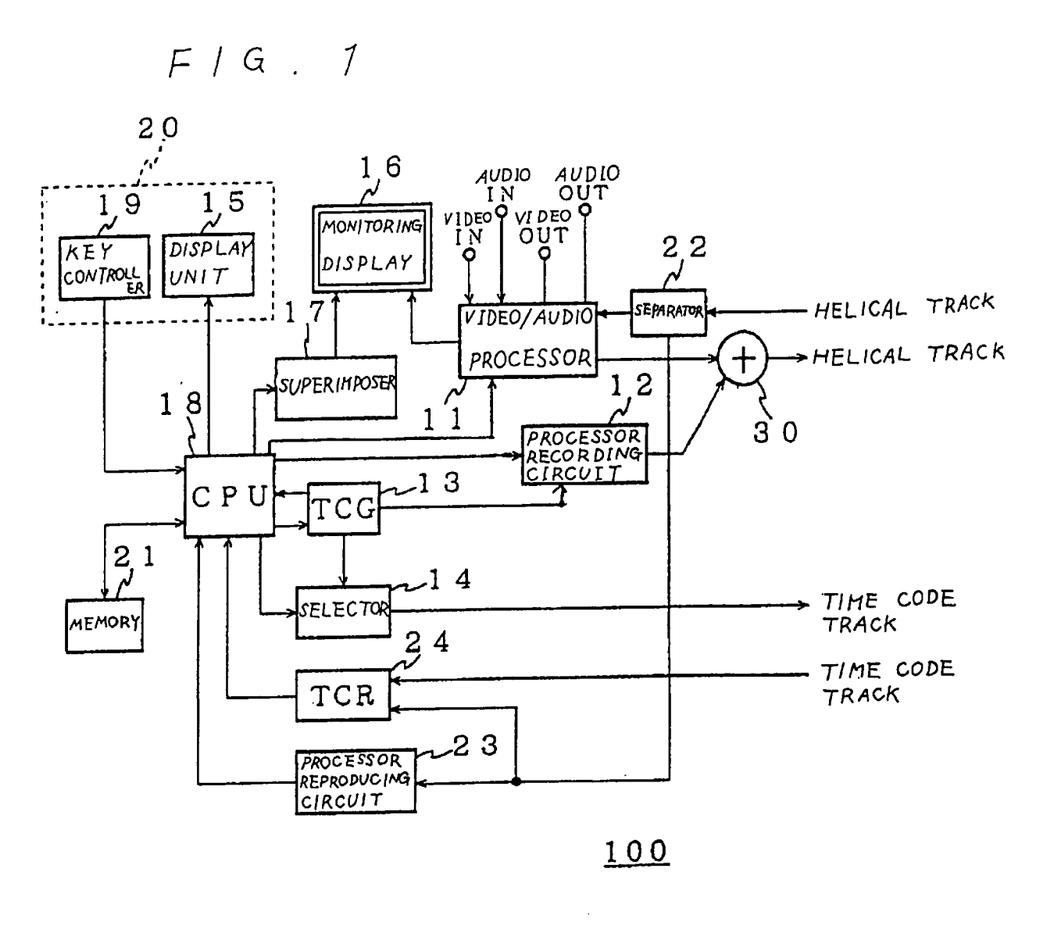
FIG. 1 is a block diagram depicting the structure of a digital VTR according to the present invention.

FIG. 1 is a block diagram showing a video tape recorder which embodies the present invention. A D1-type digital video tape recorder (hereinafter called "digital VTR") capable of processing a digital video signal, in particular, a component digital video signal, will be used as an illustration of a video tape recorder. This particular digital VTR 100 is a two-head type VTR having no slow reproducing head.

Referring to FIG. 1, the digital VTR 100 includes a recording system which includes a video/audio processor 11, a processor recording circuit 12, a time code generator 13, a selector 14 and an adder 30. Further, the digital VTR 100 includes a display system which includes a display unit 15, a monitoring display 16 and a superimposer 17.

The video/audio processor 11 converts digital video and voice signals into recording signals. The converted individual recording signals (such as video data and audio data) are recorded on a magnetic tape in helical tracks.

When a key controller 19 sets the field frequency to 60 Hz and correspondingly CPU 18 supplies a control signal to the processor recording circuit 12, the processor recording circuit 12 outputs decision or discriminant data in the form of a high bit value (One). On the other hand, when the key controller 19 sets the frame rate to 59.94 Hz and the CPU 18 supplies a control signal to the processor recording circuit 12 in response to the frame rate set by the key controller 19, the processor recording circuit 12 outputs discriminant data in the form of a low bit value (Zero). A video signal is recorded on a helical video track at a recording frame rate based on the discriminant data. The discriminant data is also recorded on the helical track.

The time code generator (TCG) 13 outputs code information about both a time code (corresponding to a time code stepped in a drop frame) for the setting of DF and a time code (corresponding to a time code stepped in a non-drop frame) for the setting of NDF. This output is independent of whether the key controller 19 has selected a DF switch setting or a NDF switch setting. These time codes are recorded on the helical track.

The selector 14 outputs a signal indicating which one of the two types of time codes are being supplied from the time code generator 13. The selector 14 also sets data indicative of the signal classification. This activity occurs in response to the control signal supplied from the CPU 18 which is sent when either of the DF setting switch or the NDF setting switch of the key controller 19 is depressed. This time code, corresponding to a record time code and a NDF or ND type, and the set data are recorded on a time code track. Either NDF or DF methods may be selected as the record time code type.

The CPU 18 controls the processor recording circuit 12 in accordance with a control signal supplied in response to a frame rate select operation of the key controller 19. Key controller 19 is disposed within a control panel 20 together with the display unit 15.

Figure 2:
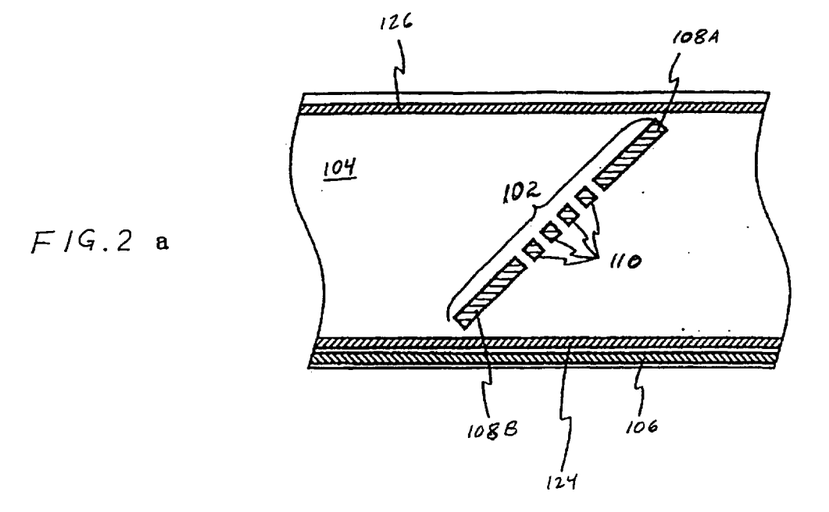
FIGS. 2a, 2b, and 2c are diagrams illustrating one example of a tape format employed in the digital VTR shown in FIG. 1.

FIGS. 2a through 2c show a tape format employed by a D1-type digital VTR. As shown in FIG. 2a, a gradient or helical track 102 on which digital video and audio signals are recorded by a rotating head, is located in the transverse direction of a magnetic tape 104. Further, a longitudinally 2 extending time code track 106 on which time codes are recorded by a fixed head, is provided on the lower edge side of the magnetic tape 104. In addition, a longitudinally extending control track 124 and a longitudinally extending analog audio track 126 are also provided near the edges of the magnetic tape 104.

The helical track 102 has video sectors 108A, 108B for recording the video signal thereon and audio sectors 110 for recording an audio signal thereon. As shown in FIGS. 2b and 2c, the video and audio sectors 108A, 108B, 110 are respectively composed of data portions 112, 114 and preambles 116, 118 and postscripts 120, 122 attached to their ends. ID data, video data and video AUX (Auxiliary) data are recorded on the data portion 112 of the video sector 108A, 108B. ID data, audio data and audio AUX data are recorded on the data portion 114 of the audio sector 110.

In this embodiment, video data supplied from the video/audio processor 11 is recorded on the data portion 112 of the video sector 108A, 108B, whereas audio data supplied from the video/audio processor 11 is recorded on the data portion 114 of the audio sector 110. Further, data regarding a recording frame rate supplied from the processor recording circuit 12 and data regarding the two types of time codes supplied from the time code generator 13 are recorded as the audio AUX data together with data attendant to the video data.

Alternatively, the time code data for the setting of DF and NDF may be recorded in an auxiliary area of a video signal recording area.

Referring back to FIG. 1, the digital VTR 100 includes a reproducing or playback system which includes a separator 22, a processor playback or reproducing circuit 23 and a time code reproducer 24.

The separator 22 separates various data reproduced from the helical track into a predetermined form. The video data and the audio data are supplied to the video/audio processor 11 where they are respectively converted into a video signal and an audio signal. The video signal is supplied to the monitoring display (hereinafter called "monitor") 16 where it is displayed on screen as character information. The audio signal is outputted to an audio system (not shown). Regarding the data reproduced as the AUX data, the data that identifies the recording frame rate is supplied to the processor reproducing circuit 23 and the data that identifies the type of time code used is supplied to the time code reproducer (TCR) 24.

The processor reproducing circuit 23 reproduces the data about the recording frame rate supplied from the separator 22. It also supplies digital data which represents either 60 Hz or 59.94 Hz as the recording field frequency to the CPU 18.

The time code reproducer 24 plays back the data about the respective time codes supplied from the separator 22, the time code data reproduced from the time code track 106, and the data indicative of the format (NDF/DF) in which the time code is recorded.

The operation of the video tape recorder 100 will now be explained with reference to FIG. 3 in the above-described embodiment. An on-recording operation will first be described. The set recording frame (60 Hz or 59.94 Hz) and the classification (NDF or DF setting) of the time code are displayed on the screen of the display unit 15 of the control panel 20 together with each time code by the operation of the key controller 19.

Figures 3A, 3B:
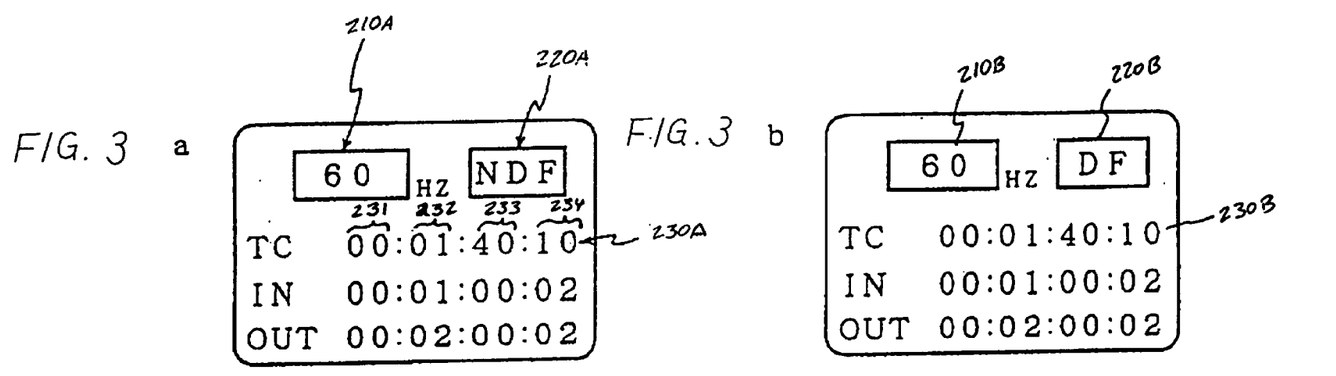
FIGS. 3a, 3b, 3c and 3d are diagrams depicting examples of various displays on a display unit of a digital VTR according to the present invention.

FIG. 3a shows a display example in which the recording frame rate 210A is 60 Hz and the classification of the time code 220A is defined as the NDF setting. In addition to these, the present time code TC 230A is displayed. The time code TC 230A is displayed in the order of the hour 231, minute 232, second 232, and frame 234. When the time code is used as for editing, respective time codes at a cut-in point (IN) and a cut-out point (OUT) are displayed on the same screen.

Figure 3C:
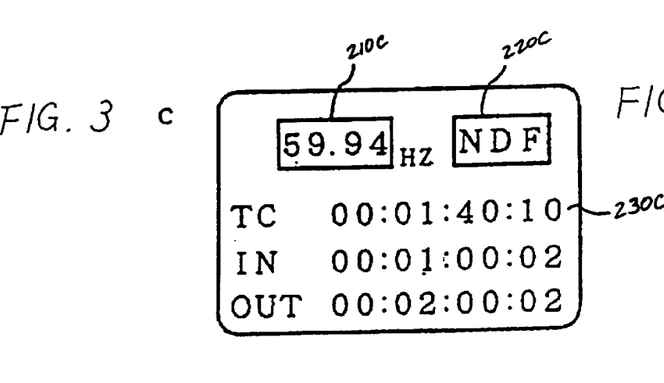
Figure 3D:
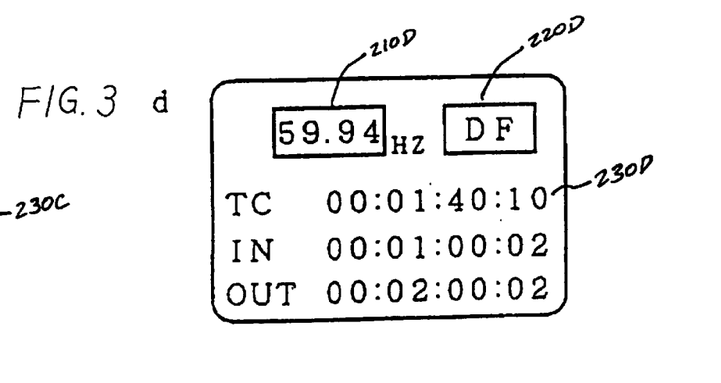

FIG. 3b illustrates a display example in which the recording frame rate 210B is 60 Hz and the classification of the time code 220B indicates a DF setting mode. FIG. 3*c* depicts a display example in which the recording frame rate 210C is 59.94 Hz and the classification of the time code 220C indicates an NDF setting mode. FIG. 3*d* shows a display example in which the recording frame rate 210D is 59.94 Hz and the classification of the time code 220D indicates the DF setting mode.

In playback mode, the superimposer 17 superimposes the aforementioned various reproduced data as a reproduced image on the monitor 16. A user can select the superimposed information that will be used. That is, a user can select a frame rate and a time code type to be used to start playback. Thus, when a time code type and frame rate which is different from those used in recording are selected for playback, the contents of the selected time codes are superimposed on an image to be reproduced. An example of a selectable mode will be explained below.

Figure 4:
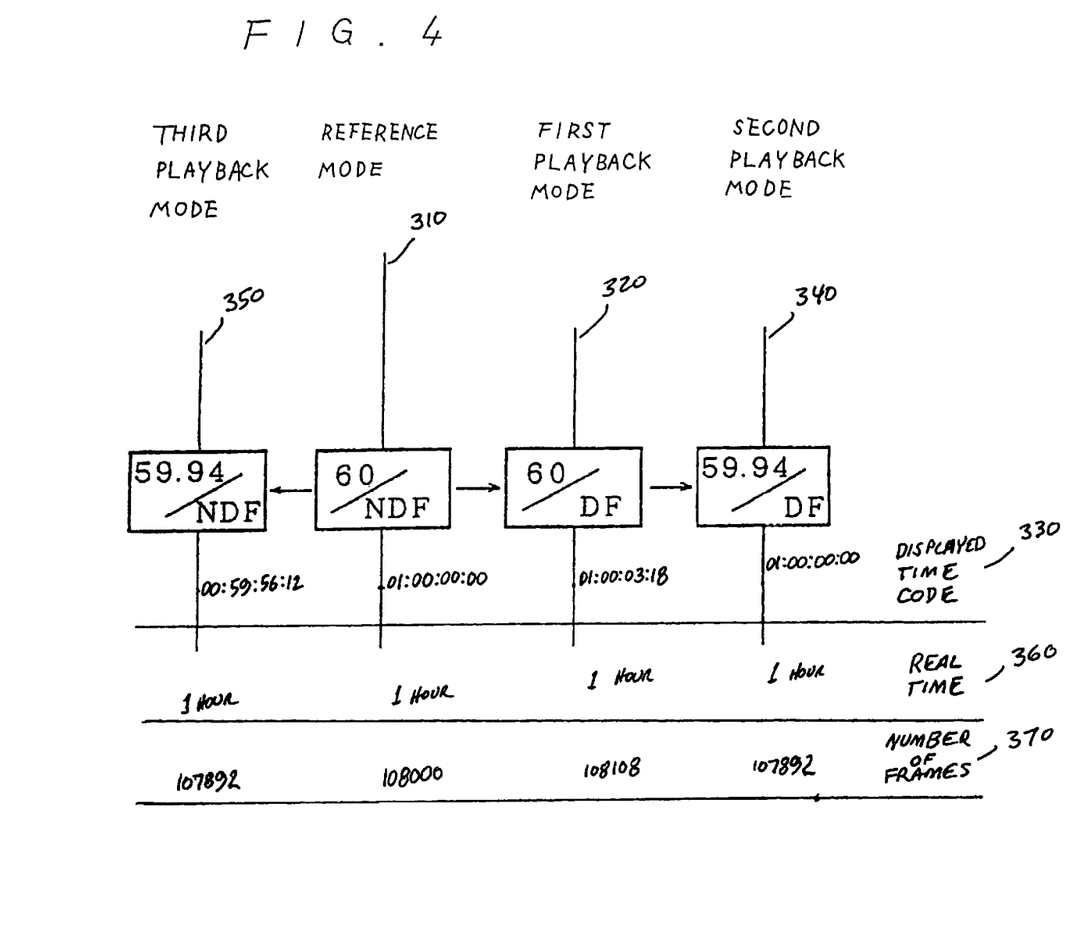
FIG. 4 is a diagram for describing the relationship between real time, differences in time codes, and the number of frames in various playback modes.

A recording mode (60 Hz/NDF), designated as row (3) in FIG. 5, will be described as a convenient illustration. The relationship between the difference between real time, time codes, and the number of frames is illustrated in FIG. 4. FIG. 4 illustrates this relationship according to the setting of the playback frame rate and the step-by-step setting of the time code in the recording mode. In this drawing, the actual recording time will be defined as one hour as in FIG. 5.

Referring to FIG. 4, after one hour of real time has elapsed, a displayed time code 330 coincides with real time 360 in a reference mode 310 (60/NDF). Since the number of frames dropped equal 108 frames per hour in a first playback mode 320 (60/DF), in contrast with the reference mode 310, the display of the time code 330 precedes the display in the reference mode 310 correspondingly. Therefore, the time code 330 to be displayed after one hour (real time 360) is displayed so as to lead by 3 seconds and 18 frames and the time code 330 does not coincide in display with the real time 360.

Since the frequency of the playback frame rate is lowered when the mode changes from the first playback mode 320 (60/DF) to a second playback mode 340 (59.94/DF), the time corresponding to a frame period is increased and the time code 330 is delayed. As a result, the second playback mode 340 coincides with the reference mode 310. That is, the real time 360 coincides with the time code 330 as displayed.

On the other hand, since the frequency of the playback frame rate is lowered upon transition from the reference mode 310 to a third mode 350 (59.94/NDF), the display of the time code 330 lags behind the real time 360 (one hour) by 3 seconds and 18 frames and hence, the time code 330 as displayed does not coincide with the real time 360.

Now the number of frames 370 are considered. Since the number of frames 370 are equal to each other when the same frame rate is used, the first playback mode 320 coincides in the number of frames 370 with the reference playback mode 310 and the number of the frames 370 is an integer. In the second and third playback modes 340, 350 in which the frequency of the frame rate is low, the number of frames 370 is reduced by a predetermined number.

It should be understood from the above description that when a time code is recorded at 60 Hz on a time code (TC) track and that time indicates the NDF-set mode (reference mode) 310, the second and reference playback modes 310, 340 may be selected based on real time 360, whereas the first and reference playback modes 320, 310 may be selected based on the number of frames 370.

Thus, even if other recording modes shown in FIG. 5 are used, a proper reproducing process can be executed by selecting a suitable playback mode based on real time and the number of frames.

When such a playback mode is selected on the control panel 20, the signal is reproduced based on the playback frame rate and time code selected by the CPU 18 and the selected playback mode is superimposed on the monitor 16.

In the embodiment described above, the data that represents the recording frame rate that was set when the recording was made and the time code data that represents the DF/NDF settings are both recorded in the AUX area of a helical track as auxiliary data. Further, the track code data that was set when the recording was made is recorded on the time code track. When the magnetic tape is played back, the track data not selected when the recording was made is played back with the track data selected when the recording was made and the data about the recording frame rate. Accordingly, the user is able to choose the step-by-step settings of the recording frame rate and the time code on the reproducing magnetic tape while confirming the contents of data via the display, regardless of the settings used at the time of the original recording.

Because the user can change the frame rate and recording time code to his desired settings and the data can be confirmed on the display screen of the monitor or the display unit of the control panel, the user can prevent errors such as mis-recognition of a real-time display when, for example, reproducing a conversion-recorded tape.

Further, a tape recorded with a time code for the DF setting which is convenient for the control of a real-time unit can also be reproduced by a time code for the NDF setting and hence, the tape can be edited using an accurate frame unit basis. On the other hand, a tape recorded with a time code for the NDF setting which is convenient for the control of a frame unit can also be reproduced by a time code for the DF setting and hence, the tape can be edited using a real-time unit basis.

According to the present invention as has been described above, since the user is able to set the method of stepping the time codes at both the time of the recording and reproduction and freely select a desired frame rate from a plurality of alternatives, the magnetic tape can be played back under settings different from those employed when the tape was recorded.

Thus, playback expressed in frame units and playback expressed in real-time units can be freely selected regardless of the settings originally recorded on the magnetic tape and without causing mis-recognition of displays and confusion between the displays. As a result, the ease and efficiency of tape-editing operations executed in frame units or real-time units is improved.

Since time-code settings (NDF/DF) can be incorporated into editing information, an edit interval can be accurately set so that the accuracy of editing is improved. Since time codes can be assigned to computer graphics, animation editing, etc. without reference to frame rates for recording and reproduction, the control of absolute recording frames becomes easy. When a high definition or Hi-Vision program created in a 60 Hz/DF mode or 59.94 Hz/DF mode is down-converted into a grand-wave signal, a further characteristic can be exploited. A high definition original image will coincide in display time with a down-converted image and the time code can be related to real time.

The present invention is not limited to the foregoing embodiments. Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments. It is intended that the following claims define the scope of the present invention. It is also intended that these claims cover the many modifications and variations that are possible within the scope of the invention and that the structures and methods of these variations and their equivalents be covered thereby.

What is claimed is:

1. A video tape recorder capable of performing signal recording and reproducing processes at a plurality of different frame rates, comprising:
    means for recording an input image signal at a selected recording frame rate; and
    means for recording a first time code stepped in a non-drop frame format and a second time code stepped in a drop frame format together with the selected recording frame rate.

2. The video tape recorder of claim 1, wherein the input image signal is recorded as a component digital image signal on a recording medium, and the time code stepped in the non-drop frame format, the time code stepped in the drop frame format, and the recording frame rate are each respectively recorded in an auxiliary area of a signal recording area on the recording medium.

3. The video tape recorder of claim 2, wherein the signal recording area of the recording medium is a video recording area.

4. The video tape recorder of claim 2, wherein the signal recording area of the recording medium is a audio recording area.

5. The video tape recorder of claim 1, wherein 59.94 Hz and 60 Hz are used as the recording frame rates.

6. A recording apparatus for recording video signals at one of a plurality of frame rates on a recording medium, comprising:
    a control circuit including:
        a frame rate selection circuit for selecting a frame rate from the plurality of frame rates;
        a counting method selection circuit for selecting a time code counting method from a plurality of time code counting methods;
        a first signal generation circuit for outputting a first controlling signal indicating the selected frame rate; and
        a second signal generation circuit for outputting a second controlling signal indicating the selected time code counting method;
    a time code generator circuit for generating a plurality of time code counts, one for each of the plurality of time code counting methods;
    a recording processing circuit including:
        a first recording circuit for recording the video signals on the recording medium at the selected frame rate in response to the first controlling signal from the control circuit;
        a second recording circuit for recording the plurality of time code counts from the time code generator circuit on the recording medium; and
        a third recording circuit for recording data indicating the selected frame rate on the recording medium; and
    a time code method selection and recording circuit for selecting a time code count from the plurality of time code counts generated by the time code generator circuit, and for recording the selected time code count on the recording medium in response to the second controlling signal from the control circuit.

7. The recording apparatus of claim 6 wherein the plurality of frame rates include 59.94 Hz and 60 Hz.

8. The recording apparatus of claim 6 wherein the plurality of time code counting methods include a first time code counting method of the video signal using drop frame stepping and a second time code counting method of the video signal using non-drop frame stepping.

9. The recording apparatus of claim 8, wherein the video signal is recorded as a component digital image signal, and the time code count stepped in the non-drop frame method, the time code count stepped in the drop frame method, and the recording frame rate are respectively recorded in an auxiliary area of a signal recording area of the recording medium.

10. The recording apparatus of claim 9 wherein the auxiliary area is part of a video signal recording area of the recording medium.

11. The recording apparatus of claim 9 wherein the auxiliary area is part of a audio signal recording area of the recording medium.

12. A recording and/or reproducing apparatus for recording input audio and video signals at a one of a plurality of frame rates on a recording medium and for reproducing audio and video signals recorded on the recording medium at one of the frame rates, comprising:
    control means for selecting one of the plurality of different frame rates,
        for selecting a first time code counting method in which drop frame stepping is used or a second time code counting method in which non-drop frame stepping is used, and
        for outputting a first control signal indicating which time code counting method is selected;
    time code generating means for generating a first time code count based on the first time code counting method and a second time code count based on the second time code counting method;
    recording medium processing means for recording the audio and video signal on the recording medium at the selected frame rate based on the first control signal,
        for recording both the first time code count and the second time code count from the time code generating means on the recording medium,
        for recording data indicating the selected frame rate on the recording medium, and
        for reproducing the audio and video signal, as recorded at the selected frame rate, and the first and second time code counts from the recording medium;
    time code selection means for selecting a time code counting method from among the first time code counting method and the second time code counting method based on the second control signal from the control means;
    time code recording means for recording the selected time code count; and
    time code reproducing means for reproducing the selected time code count recorded on the recording medium.

13. A method of recording video signals at one of a plurality of frame rates on a recording medium, comprising the steps of:
    selecting a frame rate from the plurality of frame rates;
    selecting a time code counting method from a plurality of time code counting methods;

outputting a first controlling signal indicating the selected frame rate;

outputting a second controlling signal indicating the selected time code counting method;

generating a plurality of time code counts, one for each of the plurality of time code counting methods;

recording the video signals on the recording medium at the selected frame rate in response to the first controlling signal;

recording the plurality of time code counts on the recording medium;

recording data indicating the selected frame rate on the recording medium;

selecting a time code count from the plurality of time code counts; and recording the selected time code count on the recording medium in response to the second controlling signal.

* * * * *